UNITED STATES PATENT OFFICE.

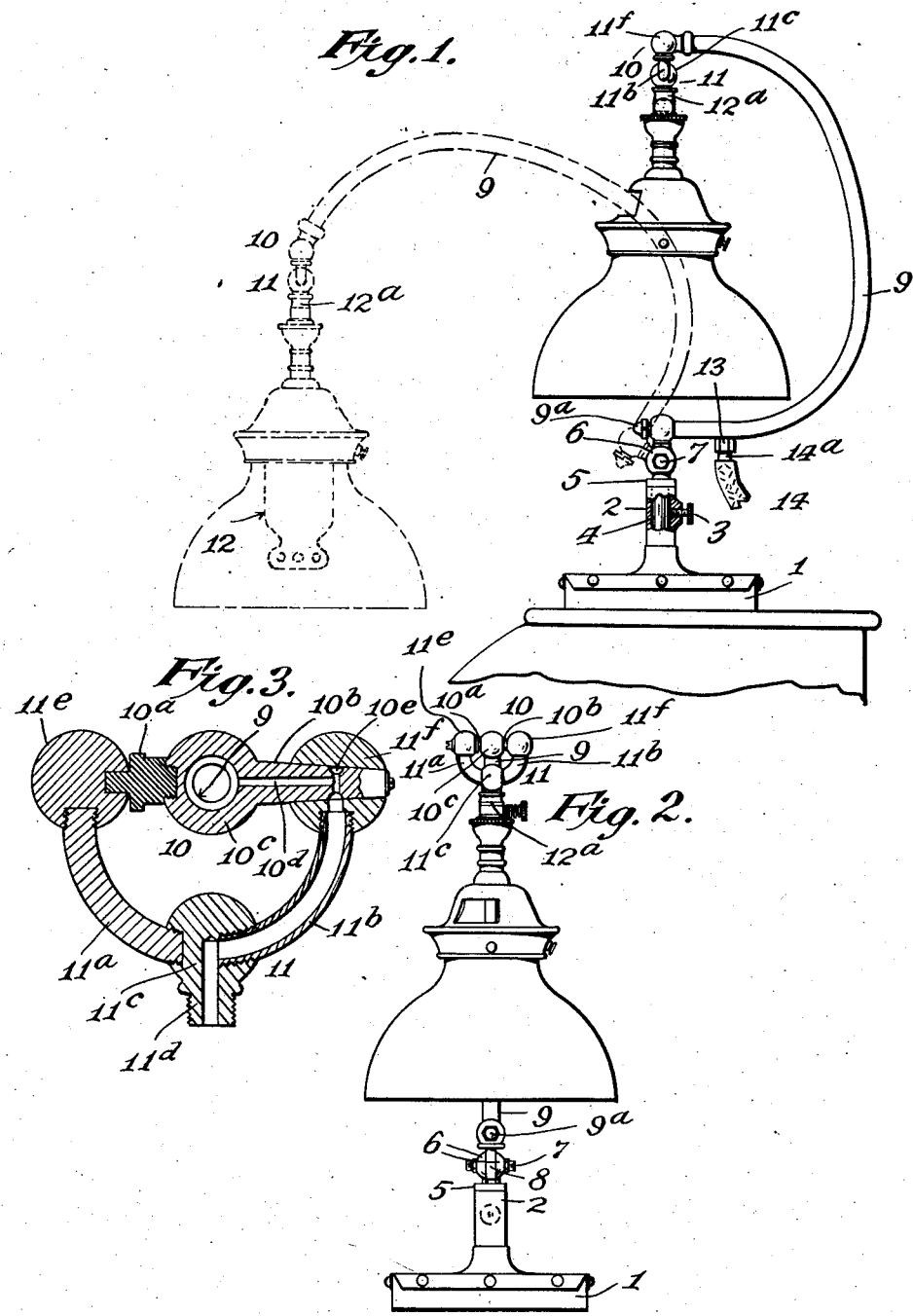

FLORENCE HIMES-COX, OF NEW YORK, N. Y.

ADJUSTABLE LAMP-STAND.

1,021,918.  Specification of Letters Patent.  Patented Apr. 2, 1912.

Application filed March 4, 1911. Serial No. 612,216.

*To all whom it may concern:*

Be it known that I, FLORENCE HIMES-COX, a citizen of the United States, residing at New York, in the county of New York and State of New York, have invented certain new and useful Improvements in Adjustable Lamp-Stands, of which the following is a specification.

My present invention relates to an adjustable lamp-stand for supporting an electric, gas or other lamp or light so that it may be used to overhang a roll-top desk and the like, or as a table lamp in various positions of adjustment so as to project the illumination in the manner or place desired.

The drawings show two of the specific forms which my invention may take, Figures 1 to 3 showing the invention applied to a gas lamp of the inverted incandescent mantle type.

More in detail, Fig. 1 is a side elevation of my adjustable lamp-stand showing it in various positions of adjustment on top of a roll-top desk; Fig. 2 is a front elevation of the same; and Fig. 3 is a vertical section partly in elevation of a detail on an enlarged scale.

I will now describe the devices of the drawings, reserving it to the claims to point out the novel features and to define the scope of the invention, it being understood that the claims will be given due range of equivalents.

Referring first to the devices of Figs. 1 to 3, 1 is the base of the stand, of sufficient weight and area to give the stand stability. It has an upright sleeve 2. A rod 4 works in this sleeve and is held therein in any position of adjustment either as to height or rotation by set screw 3. On the upper end of rod 4 is a collar 5 which in turn supports a pair of spaced apart lugs 6 between which a hinge pin 7 is transversely supported. Pivotally supported on the pin 7 between the lugs 6 is a tongue 8 which projects rigidly from the lower end of a curved arm or piece of metal pipe 9 whose upper end supports the lamp, in this case an inverted incandescent mantle gas burner 12.

$9^a$ is a plug sealing the open lower end of pipe 9.

13 is a hollow nipple on the lower portion of the pipe 9 to connect with its interior.

14 is an ordinary flexible gas tube having an externally threaded tubular end-piece $14^a$ to engage corresponding internal threads in the nipple 13. The gas coming from the supply is thus delivered from the tubing 14 to the pipe 9 and thence to the burner as next described.

10 is a cross-piece consisting of a pair of trunnions $10^a$ and $10^b$ projecting oppositely from a central or ball-portion $10^c$, the latter being screwed on the free upper end of pipe 9. A passage $10^d$ leads from a hollow space in the ball $10^c$ toward the end of trunnion $10^b$ where it connects with an external annular groove $10^e$ surrounding the trunnion.

11 is a yoke consisting of a pair of curved arms $11^a$ and $11^b$ connected by a central or ball-portion $11^c$ having an externally threaded hollow stem $11^d$. On the free ends of the arms $11^a$ and $11^b$ are end or ball-portions $11^d$ and $11^e$ provided respectively with sockets or seats for operatively receiving trunnions $10^a$ and $10^b$. The seat in ball $11^f$ has a taper gas-tight fit with the trunnion $10^b$. Since the arm $11^b$ is hollow, it follows from the above that the gas delivered by the pipe 9 reaches the hollow stem $11^d$ of the yoke by following the trunnion passageway $10^d$, annular recess $10^e$ and pipe $11^b$. It further follows that the gas is so delivered for any and all positions of swing or adjustment of the yoke 11 on its trunnions. The threaded stem $11^a$ connects with a fitting $12^a$ at the upper end of the burner 12 and thereby both supports and delivers gas thereto.

In operation, the described lamp can be used on the top of a roll-top desk as in Fig. 1, the dotted lines showing the pipe or arm 9 pulled forward and downward to throw the light on the table of the desk. The hinge joint between the arm 9 and the rod 4 or base of the stand works sufficiently hard to support the lamp at any position into which the arm is pivoted. The pivotal connection between the yoke and the upper end of the arm 9 permits the lamp to hang vertically for all positions of the arm. When using the stand on a table, the arm 9 can be similarly manipulated to throw the light on any part of the table around the base of the stand. Further, the lamp can be raised or lowered relatively to the top of the table by manipulating the set screw 3 and rod 4. For this purpose, the sleeve 2 and rod 4 may, of course, be made longer than shown so as to increase the range of the adjustment.

What I claim is:

An adjustable lamp-stand comprising a base, a hollow arm, a lamp, and pivotal connections between the base and hollow arm and between the latter and the lamp, said hollow arm being shaped so that it can be adjusted into a position wherein it supports the lamp over the base, the last named connection comprising trunnions projecting oppositely from the hollow arm, and a yoke having seats in its free ends which operatively receives said trunnions, the lamp being supported from the yoke, said yoke and trunnion connection being provided with passageways connecting the lamp with the hollow arm.

In testimony whereof I affix my signature in presence of two witnesses.

FLORENCE HIMES-COX.

Witnesses:
E. W. SCHEN, Jr.,
WILLIAM R. BAIRD.

---

Copies of this patent may be obtained for five cents each, by addressing the "Commissioner of Patents, Washington, D. C."